United States Patent [19]

Iwamoto et al.

[11] Patent Number: 4,519,210
[45] Date of Patent: May 28, 1985

[54] TURBOCHARGED INTERNAL COMBUSTION ENGINE WITH APPARATUS FOR CONTROLLING SUPERCHARGING PRESSURE

[75] Inventors: Kenji Iwamoto, Nishio; Kouichi Moriguchi, Nagoya; Ryuiti Matusiro, Okazaki, all of Japan

[73] Assignee: Nippon Soken, Inc., Nishio, Japan

[21] Appl. No.: 485,890

[22] Filed: Apr. 18, 1983

[30] Foreign Application Priority Data

Apr. 19, 1982 [JP] Japan .................................. 57-65013

[51] Int. Cl.³ ............................................ F02B 37/12
[52] U.S. Cl. .................................................... 60/602
[58] Field of Search ................... 60/600, 601, 602, 603

[56] References Cited

U.S. PATENT DOCUMENTS 4,449,367  5/1984  Moriguchi et al. .................... 60/602
4,459,808  7/1984  Rydquist et al. ...................... 60/602

FOREIGN PATENT DOCUMENTS

EP40814  12/1981  European Pat. Off. .............. 60/602
206727  12/1982  Japan ..................................... 60/602
2083135  3/1982  United Kingdom .................. 60/600

Primary Examiner—Michael Koczo
Attorney, Agent, or Firm—Cushman, Darby & Cushman

[57] ABSTRACT

An internal combustion engine with an apparatus for controlling supercharging pressure. The engine includes at its exhaust pipe a by-pass conduit by-passing a turbine of the supercharger. A by-pass valve (so-called waste gate valve) is arranged in the by-pass conduit, which by-pass valve is connected to a diaphragm type actuator. The actuator has a diaphragm opened to the intake pipe at a position between the compressor of the supercharger and a throttle valve. A fixed orifice is arranged in the conduit. The conduit is at a position between the fixed orifice and the actuator connected to the atmosphere via variable orifice. The orifice is operated in accordance with the engine acceleration condition so that the pressure at which the by-pass valve is opened is increased when the engine is accelerating.

13 Claims, 5 Drawing Figures

TURBOCHARGED INTERNAL COMBUSTION ENGINE WITH APPARATUS FOR CONTROLLING SUPERCHARGING PRESSURE

BACKGROUND OF THE INVENTION

1. Field of the Invention

The present invention relates to an internal combustion engine with an apparatus for controlling supercharging pressure, more particularly for an internal combustion engine with an apparatus for controlling supercharging pressure able to increase engine performance during engine acceleration and to achieve stable engine output against changes in atmospheric conditions.

2. Description of the Prior Art

In a conventional internal combustion engine provided with a supercharger, pressure in the intake pipe at the outlet of the compressor is controlled so that it does not exceed a limit determined by the thermal durability of engine exhaust parts and engine strength under high-speed and high-load engine operation. In the conventional supercharger engine, the engine includes at the exhaust pipe thereof a bypass conduit which bypasses a turbine of the supercharger. In the bypass conduit, a bypass valve, which is called a "waste gate valve", is arranged. The bypass valve is connected to an actuator having a diaphragm to which the supercharging pressure acts. When the pressure is lower than the predetermined limit, the bypass valve is kept closed. However, when the supercharging pressure exceeds the predetermined limit, the pressure moves the diaphragm against the force of the diaphragm spring, causing the bypass valve to open. As a result, part of the exhaust gas is deflected from the turbine to the bypass conduit. This reduces the work of the compressor and prevents the pressure from increasing above the limit. This enables the pressure at the outlet of the compressor, which is equal to the supercharging pressure during full opening of the throttle valve, to be controlled below the limit determined by the thermal durability of the exhaust system and the engine strength.

In the above-mentioned supercharger system, the predetermined limit of the supercharging pressure is determined in consideration of the prevention of knocking in a steady engine state. It should be noted that the higher the limit, the greater the occurrence of knocking. If knocking takes place, a so-called knocking feedback system operates to delay the ignition timing from a basic timing determined in accordance with combinations of the intake air amount and engine rotational speed memorized in a memory. This enables the ideal ignition timing to be obtained at every supercharge load condition.

The above-mentioned predetermined limit of the supercharging pressure, however, is directed to the steady engine state, not engine acceleration. A rotational speed which would cause knocking during the steady engine state would not cause knocking during engine acceleration, i.e., it is possible to increase the limit of supercharging pressure during engine acceleration condition without generating knocking. In the prior art supercharger internal combustion engine, however, the limit pressure has been fixed to the value determined in consideration of knocking during the steady engine state and could not be changed during engine acceleration. As a result, it has not been possible to take advantage of the potential increase in output.

The conventional system suffers from another drawback in that the output power changes in accordance with the engine atmospheric conditions. In the conventional system, the pressure of the intake air at the outlet of the compressor directly acts onto the actuator as gauge pressure. The absolute intake pressure, however, is lower under high-altitude engine atmospheric conditions. As a result, the valve will open earlier than it should, resulting in lower engine output. Contrary to this, when the atmospheric pressure is high and the atmospheric temperature is low, while the gauge pressure remains the same, the air density rises. This results on a large increase in the engine output, making it necessary to guarantee engine strength under the maximum output at high air density. This, on the one hand, increases the manufacturing cost of the engine due to the excessive quality required and, on the other hand, results in large fluctuation of the engine output during running.

SUMMARY OF THE INVENTION

An object of the present invention is to provide an internal combustion engine with apparatus for controlling supercharging pressure able to increase engine output during acceleration.

A further object of the present invention is to provide an internal combustion engine with an apparatus for controlling supercharging pressure able to achieve stable output performance against changes in atmospheric conditions.

In accordance with the present invention, there is provided an internal combustion engine comprising an engine body; an intake system for introduction of a combustible mixture into the engine; a throttle valve arranged in the intake system; an exhaust system for removal of the exhaust gas from the engine body; a supercharger having a turbine arranged in the exhaust system and a compressor arranged in the intake system at a position upstream of the throttle valve; a bypass conduit connected to the exhaust system so as to bypass the turbine; a bypass valve for controlling the opening of the bypass conduit; an actuator means for operating the bypass valve for controlling the maximum value of the intake system pressure at the outlet of the compressor; a means for detecting a knocking condition of the engine; a means for detecting the acceleration condition of the engine; a means for maintaining the maximum value when the engine is in a steady state; a first operating means responsive to signals from the acceleration detecting means for modifying the maximum value when the engine is in an acceleration condition; and a second operating means responsive to signals from the knocking condition detecting means for cancelling the operation of the first operating means.

BRIEF DESCRIPTION OF THE DRAWINGS

The present invention will now be described with reference to the attached drawing in which.

DESCRIPTION OF THE PREFERRED EMBODIMENTS

Figure 1:
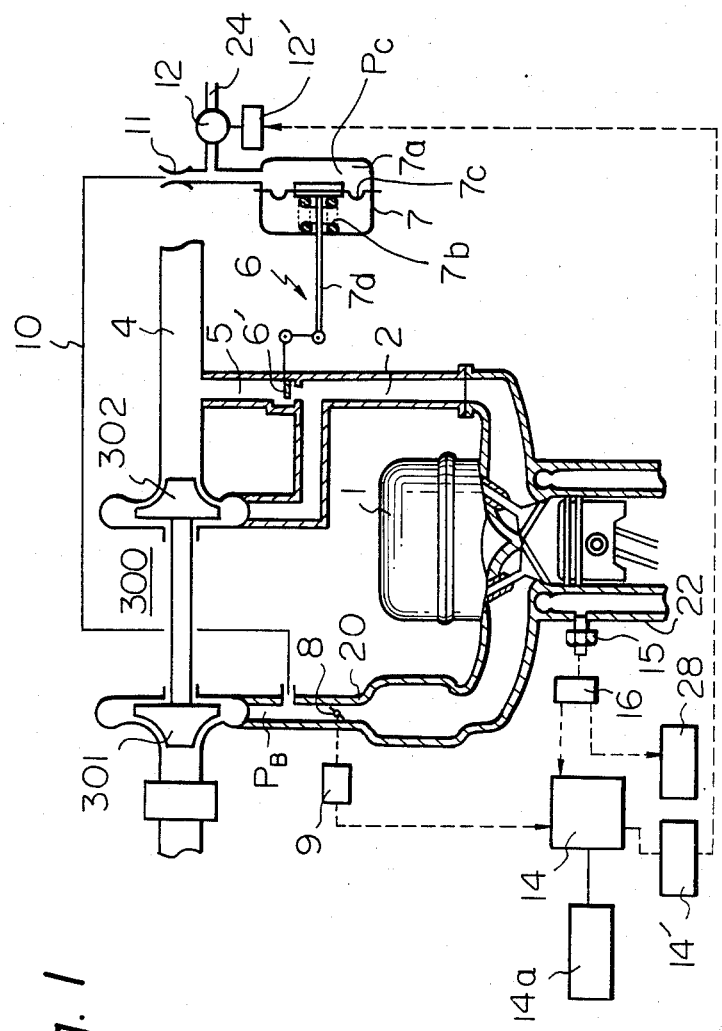
FIG. 1 is a schematic general view of a system in a first embodiment of the present invention.

In FIG. 1, showing a first embodiment of the present invention, exhaust gas from an internal combustion engine 1 is passed through an exhaust pipe 2 to a supercharger 300, so as to rotate its turbine 302, and then is issued to an exhaust pipe 4. The supercharger 300 further has a compressor 301 connected to the turbine 302. Air is compressed by the compressor 301 and is introduced into the engine 1 via an intake pipe 20. A bypass pipe 5 is connected to the exhaust pipe 2 on one end and to the exhaust pipe 4 on the other end so as to bypass the turbine 302. A bypass control valve 6 is arranged in the bypass pipe 5 in order to control the maximum pressure of the intake gas at the outlet of the compressor 301.

The bypass valve 6 comprises a swing type valve member 6' and a diaphragm actuator 7 for operating the valve member 6'. The actuator 7 has a pressure chamber 7a which is opened to the intake pipe 20 of the engine at a position between the compressor 301 and a throttle valve 8 via a conduit 10. When the pressure in the chamber 7a exceeds the predetermined level, a force generated in a diaphragm 7c becomes higher than the force of the spring 7b. As a result, a rod 7d moves against the force of the spring 7b to open the swing type valve 6'. Therefore, bypassing of the exhaust gas takes place via the bypass pipe 5.

The setting of the spring 7b is such that the diaphragm 7c is moved against the spring 7b to open the valve 6' when the pressure in the diaphragm chamber 7a is increased up to a level which corresponds to the maximum pressure $P_{Bmax}$ at the steady engine state, which maximum pressure $P_{Bmax}$ is determined by taking into consideration the thermal durability of the parts of the exhaust system as well as the engine strength.

The throttle valve 8 is connected to a throttle opening sensor 9 for issuing electric signals introduced into a control circuit 14. A piezoelectric type knocking sensor 15 is connected to the body 22 of the engine to provide electric signals indicating the degree of mechanical vibration of the engine body, which is received by a knocking discriminator 16. A signal from the knocking discriminator 16, which indicates whether or not knocking is taking place, is received by the control circuit 14.

The conduit 10 for connecting the pressure chamber 7a with the intake pipe 20 of the engine at a position between the compressor 301 and the throttle valve 8 is provided with a fixed orifice 11. A conduit 24 is connected to the conduit 10 at its one end at a position between the fixed orifice 11 and the pressure chamber 7a and is connected to the atmosphere at the other end. A variable orifice 12 is arranged in the conduit 24 for controlling the pressure in the pressure chamber 7a. The variable orifice 12 is a solenoid type valve having a solenoid 12' capable of controlling the degree of opening thereof in accordance with electric current I. The solenoid 12' is connected to an electric current controller 14' which is connected to the control circuit 14. The control circuit 14 issues signals to the electric current controller 14' to control the electric current in the solenoid 12'. The arrangement is such that the larger the electric current I, the larger the opening of the variable orifice 12. When the electric current in the solenoid 12' is zero, the orifice 12 is fully closed. In this case, the pressure $P_C$ in the pressure chamber 7a becomes substantially equal to the pressure $P_B$ in the intake pipe at the outlet of the compressor 301. At this fully closed condition of the variable orifice 12, when the pressure $P_B$ at the outlet of the compressor 301 exceeds the previous mentioned maximum limit $P_{Bmax}$, the pressure $P_C$, in the chamber 7c, which is substantially equal to $P_{Bmax}$, causes the diaphragm to move against the force of the spring 7b to open the valve member 6'. When the orifice 12 is opened due to the generation of the electric current I in the solenoid 12', the pressure $P_C$ in the pressure chamber 7c becomes smaller than the pressure $P_B$ due to the pressure drop $\Delta P$ originated from the opening of the conduit 11 to the atmosphere via the variable orifice 12. Thus, the valve member 6' cannot open only by the fact that the pressure $P_B$ in the intake pipe 20 is higher than the maximum level $P_{Bmax}$. In other words, the pressure $P_C$ is not enough to move the diaphragm 7c against the force of the spring 7b because of the pressure drop $\Delta P$. The valve member 6' can open when the pressure $P_B$ is higher than the modified maximum level $P_{Bacc}$, in which the pressure $P_C$ is increased enough to cause the diaphragm 7c to move against the force of the spring 7b, irrespective of the pressure drop occurring in the opened variable orifice 12.

The control circuit 14 is made as a microcomputer system programmed to issue signals directed to the electric current controller 14' in response to the signals from the throttle opening sensor 9 and knocking discriminator 16, in order to control the opening of the variable orifice 12. Such program is stored in a memory 14a.

Now, the routine effected by this program is explained with reference to a flow chart shown in FIG. 2 and a time chart shown in FIG. 3.

Figure 2:
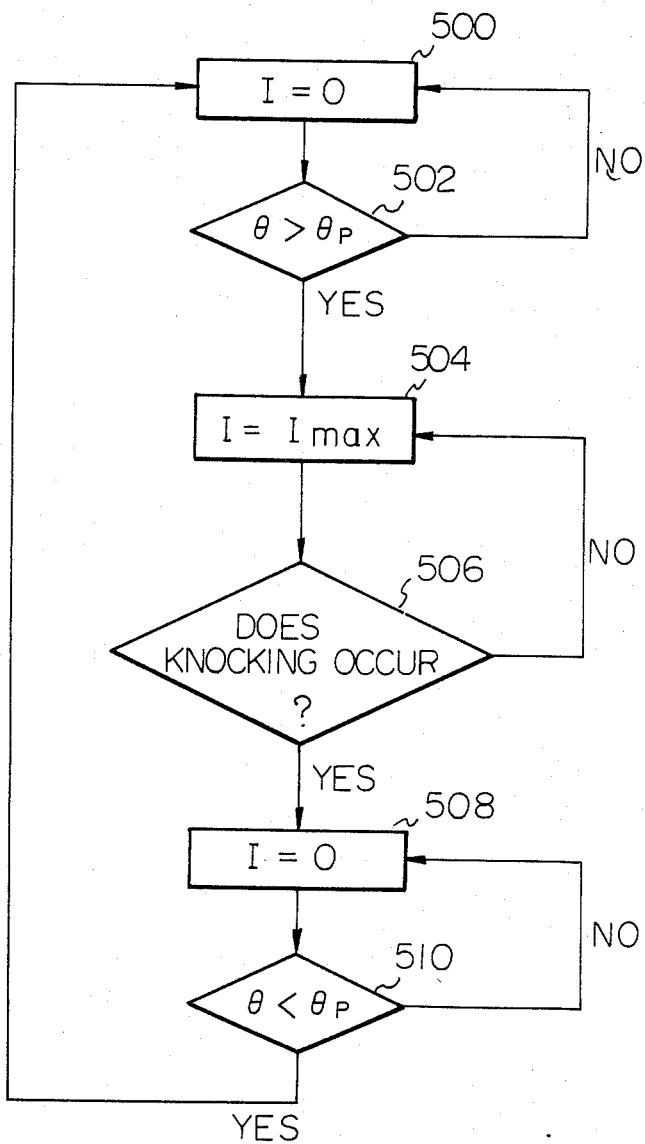
FIG. 2 is a flow chart of a routine effected by the operating circuit of FIG. 1.

As shown in point 500 of FIG. 2, at the start of the engine, the control circuit 14 initially sets the controller 14' so that the electric current I in the solenoid 12' of the variable orifice 12 is zero. After the engine starts, the throttle opening sensor 9 issues signals indicating the opening of the throttle valve 8. At point 502, it is discriminated whether or not the throttle opening degree 8 is larger than the predetermined fixed value $\theta_P$. If the opening $\theta$ of the throttle valve 8 is smaller than the predetermined fixed value $\theta_P$, the program returns to point 500 so that the control circuit 14 maintains the non-energization of the solenoid 12' of the variable orifice 12 (I=0). It should be noted that, in this steady engine state, the ignition timing H is controlled so that it has a base value $H_1$ which is determined in accordance with a combination of the intake air amount and engine rotational speed, as is well known to those skilled in the art (FIG. 3(d)).

Figure 3:
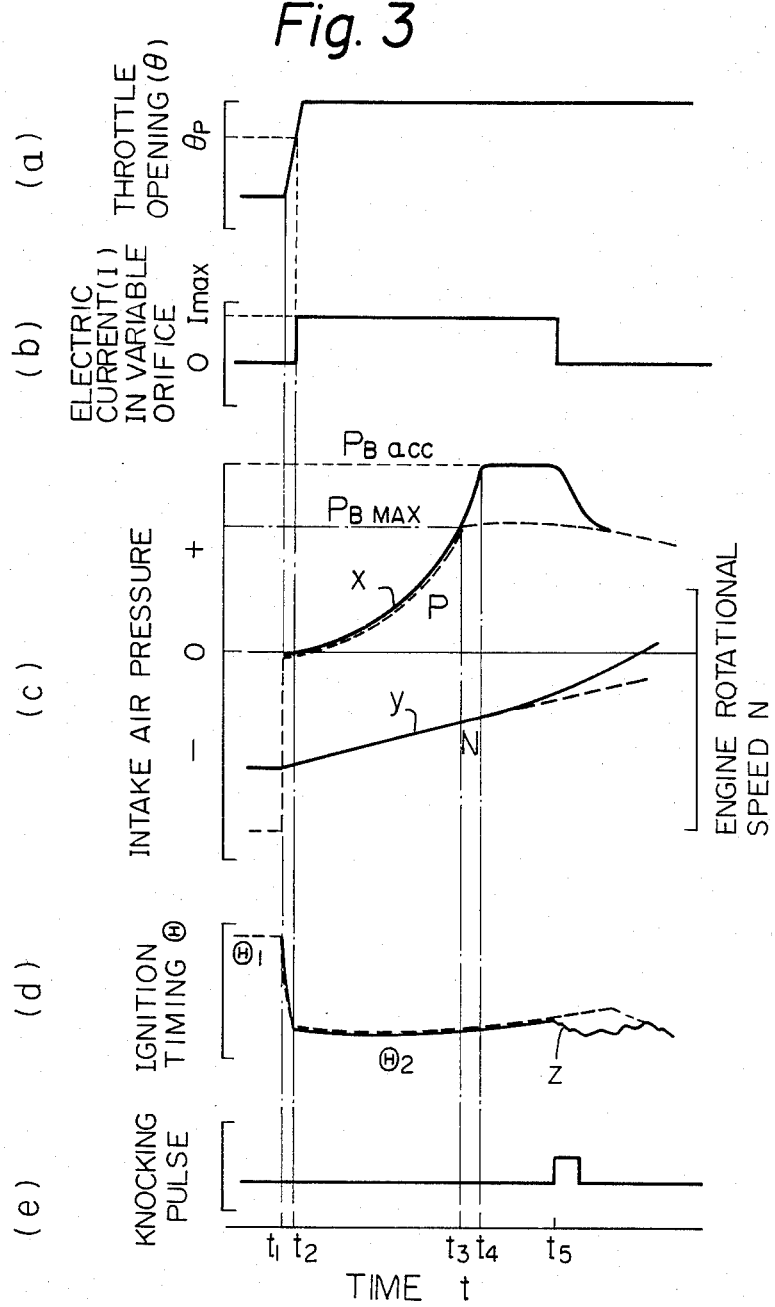
FIG. 3 is a graph of changes of engine operating conditions when acceleration is started.

The start of acceleration increases the opening of the throttle valve from time $t_1$ in FIG. 3 to over the predetermined value $\theta_P$ at time t2. In this case, the result of the discrimination at point 502 is "yes". The program then proceeds to point 504. Thus, the control circuit 14 issues a signal to the controller 14' to make the electric current I in the solenoid of the variable throttle Imax (FIG. 3(b)). In this case, the variable orifice 12 is opened to open the conduit 10 to the atmosphere at a predetermined degree. As a result, a pressure drop $\Delta P$ occurs in the conduit 10 between the fixed orifice 11 and the pressure chamber 7a. In other words, the pressure $P_C$ in the pressure chamber 7a becomes smaller than the pressure $P_B$ in the intake pipe at the output of the compressor. During the process of acceleration, the supercharger compressor 301 is forced to operate. Then, the pressure $P_B$ becomes higher than the atmospheric pressure and progressively increases, as shown by line x in FIG. 3(c). Simultaneously, the rotational speed N of the engine is increased, as shown by a line y. Due to the increase of the intake pressure, the vacuum advance of the engine is cancelled, so that ignition timing is delayed to $H_2$, as shown in FIG. 3(d).

At point 506 of the flow chart in FIG. 2, it is discriminated whether or not knocking take place. Knocking does not take place at the beginning of acceleration. In this case, the program then returns to point 504 to maintain the electric current Imax in the variable orifice solenoid 12'. At the time t3, the pressure $P_B$ at the outlet of the compressor exceeds the maximum permissible pressure $P_{Bmax}$ at the steady engine state. However, the pressure $P_C$ in the pressure chamber 7a is smaller than the level determined by the setting of the spring 7b, due to the pressure drop $\Delta P$ occurring in the opened orifice 12 so that the pressure $P_B$ at the outlet of the compressor can exceed the limit $P_{Bmax}$ at the steady state. At the time t4, the pressure $P_B$ of the intake air at the outlet of the compressor 301 is increased to $P_{Bacc}$. In this case, the pressure $P_C$ in the pressure chamber 7c is enough to move the diaphragm 7c against the spring 7b, causing the bypass valve 6 to be opened.

As clear from the above, according to the invention, bypass of the exhaust gas via the bypass valve 6 does not occur when the pressure $P_C$ in the chamber 7a is smaller than the value initially set by the spring 7b. In other words, the maximum pressure at the outlet of the compressor 301 is, during acceleration, increased to $P_{Bacc}$, which is larger than the limit value $P_{Bmax}$ during the steady state, by energizing the solenoid 12' of the variable orifice 12. It should be noted that $P_{Bacc}$ may be variably set by adjusting the dimensions of the fixed orifice 11 and the value of the electric current Imax.

If acceleration is continued while maintaining the maximum pressure $P_{Bacc}$, knocking will take place at time t5 and the knocking discriminator 16 will issue a knocking pulse, as shown by FIG. 3(e). In this case, the result of the discrimination at point 506 in the flow chart in FIG. 2 becomes "yes". The program then proceeds to point 508, whereupon the control circuit 14 issues a digital signal to the controller 14' to make the electric current in the solenoid 12' of the variable orifice 12 equal to zero. This fully closes the variable orifice 12, so that no pressure loss takes place in the conduit 10. Therefore, the pressure $P_C$ in the pressure chamber 7a becomes substantially equal to the pressure $P_B$ at the outlet of the compressor 301. Thus, the bypass valves continues to open until the pressure $P_B$ is decreased to the predetermined value $P_{Bmax}$ at the steady engine state, as shown in FIG. 3(c).

It should be noted that the system is provided with an ignition timing control device 28 responsive to knocking signals for delaying the ignition timing as shown by a line z in FIG. 3(d). This device is itself well known and is not described because it has no direct relationship with the present invention.

The closed-off condition of the variable orifice 12, achieved by maintaining a zero value of the electric current I, is continued until the opening degree $\theta$ of the throttle 8 is larger than $\theta_P$ (point 510).

If the throttle valve is, to stop the acceleration, closed the result of the discrimination at the point 510 is "yes". Then, the program proceeds to point 500 to repeat the above-mentioned operation.

Figure 4:
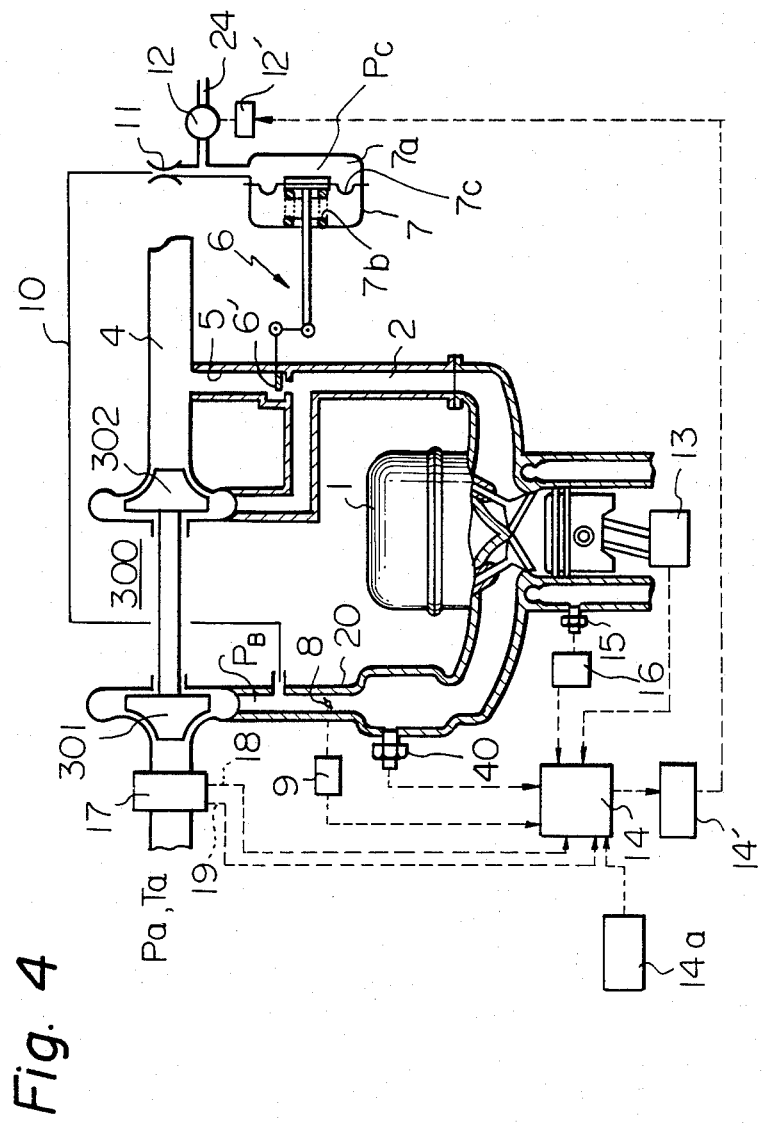
FIG. 4 is a schematic general view of a system in a second embodiment of the present invention.

In a second embodiment shown in FIG. 4, in addition to the sensors 9 and 15, additional sensors are provided for control of the variable orifice 12 in accordance with atmospheric conditions. A rotational speed sensor 13 is provided for obtaining electric signals indicating the rotational speed of the engine. In the intake pipe of the engine, at an air flow meter 17, an atmospheric pressure sensor 18 and atmospheric temperature sensor 19 are arranged. The electric signals from the sensors 18 and 19 are introduced to the control circuit 14. A vacuum switch 40 is arranged on the intake pipe 20 at a position downstream of the throttle valve 8. The vacuum switch 40 detects a predetermined fixed level of vacuum in the intake pipe. The memory 14a includes a map of data of electric current to be applied to a variable orifice solenoid 12'. Such data are, at every engine rotational speed range of, for example, 400 rpm, stored in the memory with respect to every combination of the atmospheric pressure and atmospheric temperature data. The stored data of the electric current $I_1$ are such that the electric current is increased in accordance with decrease of the atmospheric pressure Pa and is increased in accordance with increase of the atmospheric temperature Ta. In other words, the maximum value of the pressure $P_B$ at the outlet of the compressor 301 is changed in accordance with the engine atmospheric conditions.

In this case, the initial setting of the spring 7b, during the non-energization of the solenoid 12' (I=0), i.e., the full closing of the orifice 12, is such that the diaphragm 7c is moved against the spring 7b to open the bypass valve 6 when the pressure $P_B$ at the outlet of the compressor 301 is higher than the maximum limit $P_{Bmax}$ in the state where the atmospheric pressure Pa is high and the atmospheric temperature Ta is low, which value $P_{Bmax}$ is determined from the thermal durability of the parts of the engine.

The control circuit 14 is made as a microcomputer system programmed to issue digital signals to the electric current controller 14 in response to the signals from the sensors 9, 13, 15, 18, 19, and 40, to control the opening of the variable orifice 12. The program is stored in a memory 14a.

Figure 5:
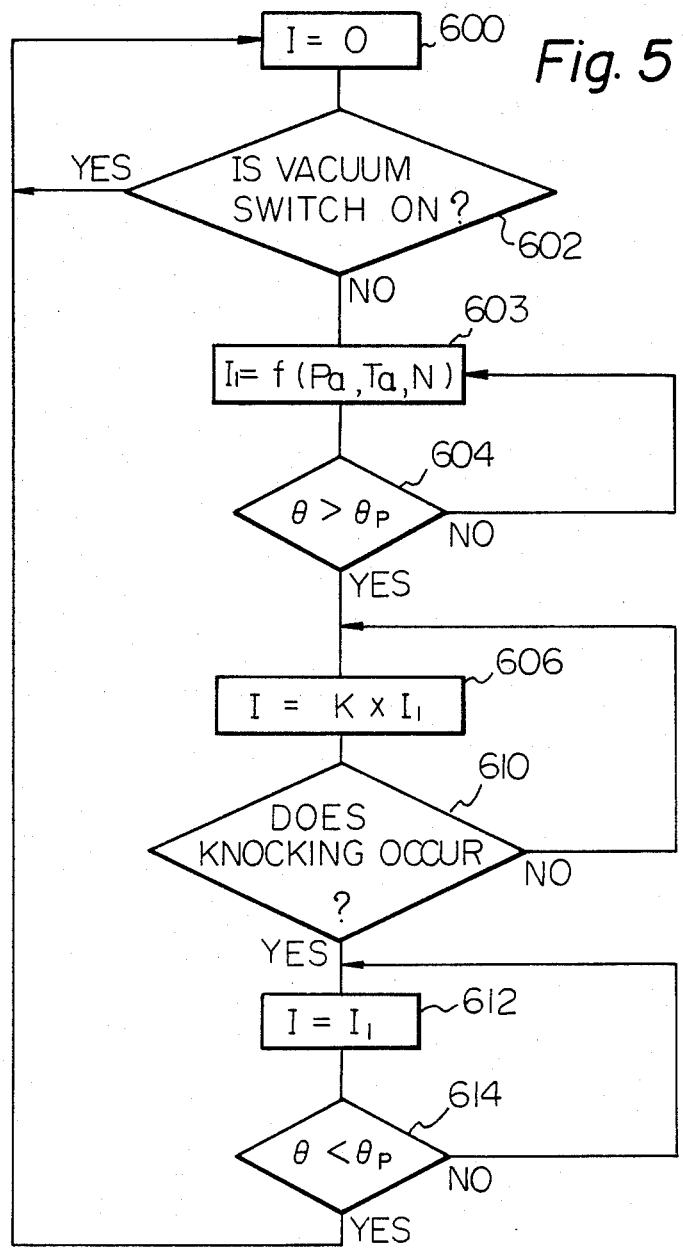
FIG. 5 is a flow chart of a routine as effected by the control circuit in FIG. 4.

The routine effected by this stored program is explained with reference to FIG. 5. As shown in the point 600 of FIG. 5, at the start of the engine, the engine control circuit 14 initially sets the electric current controller 14' to make the electric current I in the solenoid 12' of the variable orifice 12 equal to zero. In this case, the variable orifice 12 is fully closed, so that the pressure $P_C$ at the pressure chamber 7a is equal to the pressure $P_B$ at the outlet of the compressor 301. The bypass valve 6 is opened when the pressure $P_B$ at the outlet of the compressor 801 is higher than a value corresponding to the permissible pressure level $P_{Bmax}$ at the condition where the atmospheric pressure Pa is high and the atmospheric temperature Ta is low.

At the point 602, it is discriminated whether or not the vacuum switch 40 is in the "on" condition. If the result of the discrimination is "yes", the program returns to 600 to maintain the electric current I at zero, so that the maximum pressure at the outlet of the compressor 301 is maintained at a predetermined level $P_{Bmax}$. If the result of the discrimination is "no", the program proceeds to point 603 where value I of the electric current $I_1$ is calculated in accordance with the detected atmospheric pressure Pa, atmospheric temperature Ta, and the rotational speed N by the sensors 19, 18, and 13.

The memory 14a includes electric current data for a plurality of combinations of atmospheric air pressure and atmospheric temperature for different rotational speed ranges. The central processing unit in the control circuit 14 calculates from the maps a value of the electric current $I_1$ corresponding to sensed data of atmospheric pressure, atmospheric temperature, and rotational speed obtained by the atmospheric pressure sensor 18, atmospheric temperature sensor 19, and a rotational speed sensor 13. The calculation allows the variable setting of the electric current $I_1$ so that it corresponds to the atmospheric pressure and temperature as well as the rotational speed. Then, the controller 14' is energized to generate in the solenoid 12' of the variable orifice 12 an electric current corresponding to the calculated value. Thus, the variable orifice 12' is opened at the degree corresponding to the electric current. The maximum pressure at the outlet of the compressor 301 is, during the steady engine state, increased to $P_{Batm}$, which corresponds to the atmospheric condition. In other words, an increase of the output is realized when the atmospheric pressure is low and the atmospheric temperature is high.

At the point 604, it is discriminated whether or not the throttle opening is larger than the predetermined level $\theta_P$. The point 604 is substantially the same as the point 502 in FIG. 2. If the result of the discrimination at the point 604 is "no", the program returns to point 603 to maintain I to equal to $I_1$.

If the result of the discrimination at the point 604 is "yes", the program then proceeds to point 606 where the electric current $I_1$ is multiplied by K. Thus, the variable orifice 12 is, during acceleration, opened further. The pressure of the outlet of the compressor 301 where the bypass valve 6 is opened is increased to $P_{Bacc}$, which is larger than the maximum pressure $P_{Batm}$ during the steady engine state.

If knocking takes place during engine operation at the pressure $P_{Bacc}$, the result of the discrimination at the point 610 is "yes". The program proceeds to point 612, where the control circuit 14 issues a signal to the electric current controller 14' so to change the electric current to $I_1$, which is determined in accordance with the engine rotational speed as well as atmospheric conditions at the time of the knocking. Thus, the opening of the orifice 12 is decreased, so that the pressure loss at the orifice 12 is decreased. Thus, bypass valve 6 is opened when the pressure in the intake pipe 20 at the outlet of the compressor 301 is decreased to $P_{atm}$. The operation after this is similar to that of FIG. 2.

The variable orifice in the first embodiment may be an on-off type solenoid valve. However, the opening must be determined in such a manner that the maximum pressure is attained.

In the first and the second embodiments, the control circuit is constructed as software. However, the control circuit may be made by hardware wherein a pressure sensor is arranged at the outlet of the compressor providing electric signals indicating the pressure and wherein a feedback control device is provided for controlling the electric current in the variable orifice solenoid so that a desired pressure in the intake pipe is obtained.

In place of the knocking sensor 15, a timer means may be provided for issuing the electric signals for decreasing the electric current in the variable orifice solenoid to zero (I=0) when a predetermined time has elapsed from the start of acceleration.

Many modifications and change may be made by those skilled in this art without departing from the scope of the invention.

We claim:

1. An internal combustion engine comprising:
an engine body;
an intake system for introducing a combustible mixture into the engine body;
a throttle valve arranged in the intake system;
an exhaust system for removing exhaust gas from the engine body;
a supercharger having a turbine arranged in the exhaust system and a compressor arranged in the intake system at a position upstream of the throttle valve;
a bypass conduit connected to the exhaust system so as to bypass the turbine;
a bypass valve for controlling the amount of opening of the bypass conduit;
an actuator means for operating the bypass valve for controlling maximum exhaust flow to the turbine thereby controlling the maximum value of the intake system pressure at an outlet of the compressor;
means for detecting a knocking condition of the engine;
means for detecting an acceleration condition of the engine;
means for maintaining the maximum value at a first value when the engine is in a steady state;
first operating means, responsive to signals from the acceleration detecting means, for increasing the maximum value from said first value to a second value when the engine is in an acceleration condition; and
second operating means, responsive to signals from the knocking condition detecting means, for cancelling the operation of the first operating means thereby causing said maximum value to be said first value.

2. An internal combustion engine according to claim 1, wherein said actuator means comprises:
fluid pressure drive means responsive to a fluid pressure level;
a first conduit connecting the fluid pressure drive means with the intake system at a position downstream of the compressor; and
orifice means, responsive to the signals from the first or second operating means, for controlling the fluid pressure level in the fluid pressure drive means.

3. An internal combustion engine according to claim 2, wherein said first conduit includes a fixed orifice having a predetermined inner dimension; and said orifice means comprise a second conduit for connecting the first conduit, at a position between the fluid pressure drive means and the fixed orifice, with the atmosphere and a variable throttle valve arranged in said second conduit.

4. An internal combustion engine according to claim 1, wherein said fluid pressure drive means comprises:
a diaphragm;
means for connecting the diaphragm with the bypass valve; and
spring means for urging the diaphragm so that the bypass valve normally closes the bypass conduit.

5. An internal combustion engine according to claim 1, wherein said knocking condition detecting means comprises:
a piezoelectric type sensor for transforming engine mechanical vibration into electric signals; and
discrimination means for issuing a signal as the output of said knocking condition detecting means when the level of the electric signal from the sensor is larger than a predetermined value.

6. An internal combustion engine according to claim 1, wherein said acceleration sensor means comprises a sensor for detecting a degree of opening of said throttle valve to provide a signal indicating that the throttle valve is opened for acceleration.

7. An internal combustion engine according to claim 1, wherein said first operating means comprises:
means for receiving signals from the acceleration sensor means;
means for discriminating whether or not the throttle opening is larger than a predetermined throttle valve opening amount;
means for providing signals directed to the actuator means so that the bypass valve is opened at a maximum value of intake system pressure when the throttle opening is smaller than the predetermined level; and
means for providing signals to the actuator means so that the bypass valve is closed at the increased or modified maximum value of the intake system pressure when the throttle valve is larger than the predetermined level.

8. An internal combustion engine according to claim 1, wherein said second operating means comprises:
a means for providing signals to the actuator means so that the bypass valve is opened to cause intake pressure to be limited to said second value when a signal indicating knocking is not received; and
means for providing a signal directed to the actuator means so that the bypass valve is opened to cause intake pressure to be limited to said first value when a signal indicating knocking is received.

9. An internal combustion engine according to claim 8, further comprising means, responsive to a rotational speed of the engine, for correcting the maximum value during steady state engine operation.

10. An internal combustion engine according to claim 9, wherein said correcting means comprises:
a rotational speed sensor for detecting rotational speed of said engine;
means for storing data of maximum pressures in accordance with various rotational speeds of the engine; and
means for correcting the maximum value in accordance with the detected rotational speed;
wherein said first operating means comprises a means for calculating the modified value as a product of the corrected value and a constant.

11. An internal combustion engine according to claim 1, further comprising means for correcting the corrected maximum value during steady state engine operation in accordance with atmospheric conditions.

12. An internal combustion engine according to claim 11, wherein said correcting means comprises:
an atmospheric pressure sensor for providing signals indicating the atmospheric pressure around the engine;
an atmospheric temperature sensor for providing signals indicating the atmospheric temperature around the engine;
means for storing the data of corrected value with respect to various combinations of atmospheric pressure and atmospheric temperature; and
means for calculating a value of corrected data corresponding to a detected combination of the atmospheric pressure and the atmospheric temperature.

13. An internal combustion engine according to claim 12, further comprising
means for detecting a vacuum level in the intake system at a position downstream of the throttle valve,
means for discriminating whether or not the vacuum level is higher than a predetermined value; and
means for cancelling the correction of the maximum value when the vacuum is smaller than the predetermined value.

* * * * *